United States Patent [19]
Deal

[11] Patent Number: 5,694,261
[45] Date of Patent: Dec. 2, 1997

[54] DIVER'S MIRROR

[76] Inventor: Jerry L. Deal, 1228 Paloma Ave., Burlingame, Calif. 94010

[21] Appl. No.: 561,036

[22] Filed: Nov. 20, 1995

[51] Int. Cl.$^6$ .................... G02B 5/08; G02B 7/182
[52] U.S. Cl. ............... 359/879; 359/517; 2/160; 2/DIG. 8; 405/186
[58] Field of Search ................. 359/515, 516, 359/518, 838, 840, 879, 880, 871, 872; 2/160, DIG. 8; 405/186

[56] References Cited

U.S. PATENT DOCUMENTS

| | | |
|---|---|---|
| 79,071 | 7/1868 | Gebauer. |
| 81,132 | 5/1868 | Gebauer. |
| 1,139,560 | 5/1915 | Mosher ............................ 359/879 |
| 1,499,175 | 12/1924 | Holquist ........................... 359/879 |
| 2,265,094 | 12/1941 | Wolfe ............................... 359/879 |
| 2,327,513 | 8/1943 | Esterow. |
| 3,019,710 | 2/1962 | Bean. |
| 3,717,103 | 2/1973 | Messuer ............................ 359/879 |
| 3,717,403 | 2/1973 | Messier ............................ 359/879 |
| 4,636,047 | 1/1987 | Green .............................. 350/641 |
| 4,960,399 | 10/1990 | Lyon ............................... 441/136 |
| 5,033,818 | 7/1991 | Barr ................................ 350/174 |
| 5,361,169 | 11/1994 | Deal ................................ 359/838 |

FOREIGN PATENT DOCUMENTS

| | | | |
|---|---|---|---|
| 0872759 | 4/1953 | Germany ......................... 359/519 |
| 0028450 | of 1913 | United Kingdom ................ 359/519 |
| 00345766 | 4/1931 | United Kingdom ................ 359/879 |

Primary Examiner—Ricky D. Shafer
Attorney, Agent, or Firm—LaRiviere, Grubman & Payne

[57] ABSTRACT

A mirror which is attachable to an item of an underwater diver's equipment. By placing the mirror in front of his face mask and controlling the line of sight reflected by the mirror, the diver can inspect equipment on his body or easily access equipment with the hand not wearing the mirror. In addition, the diver's peripheral vision is improved so he or she can see objects, fish or a diving partner located behind them. The mirror is attached to the item of diver's equipment by attaching a portion of the periphery of a pouch to the equipment item. Affixed to the pouch is a tether which is further attached to the mirror. The pouch is formed of water resistant material such as nylon or rubber.

13 Claims, 3 Drawing Sheets

DIVER'S MIRROR

TECHNICAL FIELD

The present invention relates to underwater diving accessories in general, and to diving accessories which enable a diver to see portions of him or herself or his or her surroundings heretofore un-viewable due to the restrictive nature of the diver's equipment.

BACKGROUND OF THE INVENTION

The underwater environment is both beautiful and dangerous. Divers must rely on their senses and mobility to avoid harm. However, the protective equipment and accessories necessary for the diver to survive in this environment have an ancillary and detrimental effect on visibility and mobility. Because a diver's visibility and mobility are restricted, a cardinal rule in diving is to always dive with a partner or "buddy." The diving partner can view a diver's immediate surroundings and warn of danger and can also assist a diver in adjusting or checking his or her equipment. Three distinct categories of divers are typical. Free or snorkel divers use little equipment other than swim fins, a face mask and a snorkel that consists of a mouth piece attached to a tube extending above the water surface and allowing the diver to breathe while his or her head is slightly below the surface of the water. SCUBA (self contained underwater breathing apparatus) divers, on the other hand, wear a tank or tanks of compressed air allowing them to swim for extended periods of time at depths significantly below the surface of the water. The compressed air tank(s) are attached by one or more tubes to a breathing regulator to control the flow of air from the tank to the diver and to control or route exhaust from the diver's lungs to the environment. Because SCUBA divers can remain underwater for extended periods of time, they usually wear additional equipment to protect them from the environment, to enhance their enjoyment of the surroundings, and to allow them to accomplish work tasks while they are underwater. Examples of equipment used by SCUBA divers include a wet suit to protect them from cold water, a weight belt to counteract buoyancy, a vest to hold tools and equipment, a buoyancy compensator to adjust buoyancy, an accessory console to hold gauges, as well as cameras, spear fishing equipment, knives and various other accessories. Hard hat divers wear more substantial protection to allow them to descend to depths greater than those achievable by SCUBA divers. The hard hat diver wears a water impervious suit with a metal or composite material helmet attached. Air is provided to the diver by a tube extending to the surface and fed by an air compressor at the surface. Again, the hard hat diver uses various accessories to enhance his enjoyment of the surroundings, protect him against the environment, provide for his safety, or to accomplish work-related tasks.

All of these divers suffer restricted mobility and vision because of the equipment used. Some of the equipment restricts movement of the diver's head and therefore restricts the diver's view of his surroundings and especially the diver's view of equipment and accessories attached to his body. All diver's wear some form of face mask to insulate their eyes from the water. The face mask contains clear lenses held in front of the diver's eyes by a generally opaque rubber or silicon frame that seals out water from the diver's face. Because of this construction, a diver's face mask severely limits his or her peripheral vision. In the case of the free or snorkel diver, the face mask and snorkel restrict downward movement of his head, thus preventing a clear view of the upper portions of his body. The problem is compounded with the SCUBA diver where the air regulator, buoyancy compensator and wet suit further restrict his downward or side-to-side movement of his head. The problem is extreme with the hard hat diver as his peripheral vision is severely limited and he is totally unable to see his upper body.

This restricted mobility and restricted visibility make it extremely difficult for the diver to manually access or visually check equipment worn on his body and especially his upper torso or head. Often, it is necessary to have a diving partner check the diver's equipment or assist the diver in grasping equipment. Additionally, it is sometimes difficult in this hostile environment to locate a diving "buddy" or other divers due to the restricted peripheral vision and mobility. What is needed is a simple and effective device for improving a diver's peripheral vision. The improved peripheral vision assists the diver in gaining manual access or sight of equipment worn by the diver on his body or head, and provides an effective means for locating another diver, diving "buddy" or other objects without fully turning the body.

SUMMARY OF THE INVENTION

One object of the present invention is to enhance the peripheral vision of an underwater diver.

Another object of the present invention is to increase a diver's safety by allowing the diver to easily see behind him to view danger or to locate a diving partner.

Another object of the present invention is to allow a diver to visually check equipment and accessories attached to his body.

Still another object of the present invention is to assist a diver in gaining manual access to equipment he wears in vests or belts around his body.

Yet another object of the present invention is to provide a means for increasing a diver's peripheral vision which can be attached to an existing diver's console which contains a compass and other diver information displays.

These and other objects are attained with a mirror which is attached to the any of several pieces of the diver's equipment. While a preferred location for this mirror is in the general vicinity of the diver's hand, the principles of the present invention may with equal facility be implemented by locating the mirror on any element of the diver's equipment. By way of illustration, but not limitation, this equipment includes, but is not limited to the diver's: wetsuit, dry suit, helmet, gloves, buoy compensator, weight belt, instruments, breathing apparatus, weight belt, mask, hood, and booties as well as various belts and harnesses.

By placing the mirror in front of his face mask and controlling the line of sight reflected by the mirror, the diver can inspect equipment on his body or easily access equipment with the hand not wearing the mirror. Additionally, the mirror can be used for inspection of difficult to reach locations underwater, such as under rocks, in crevices or in any of several constricted work sites. One or more mirrors are attached to the diver's equipment by means of a pouch, which pouch is further attached to the diver's equipment. The pouch contains the mirror which is attached by flexible strap to the pouch. The diver can easily remove the mirror from the pouch and hold it in his or her palm to view objects. Another embodiment of the invention mounts the mirror on a hinged plate attached to an item of equipment, for instance a diver's console which contains a compass, depth gauge and other information displays, or his glove. The hinged plate allows the diver to flip the mirror into an upright position allowing viewing of equipment on the diver's body and to aid in peripheral vision even while the compass or other displays are being viewed. A plurality of mirrors can be used on multiple, hinged plates to allow the diver to select the correct mirror for the task at hand.

BRIEF DESCRIPTION OF THE DRAWING

For fuller understanding of the present invention, reference is made to the accompanying drawing in the following detailed description of the Best Mode of Carrying Out the Invention. In the drawing.

Figure 1:
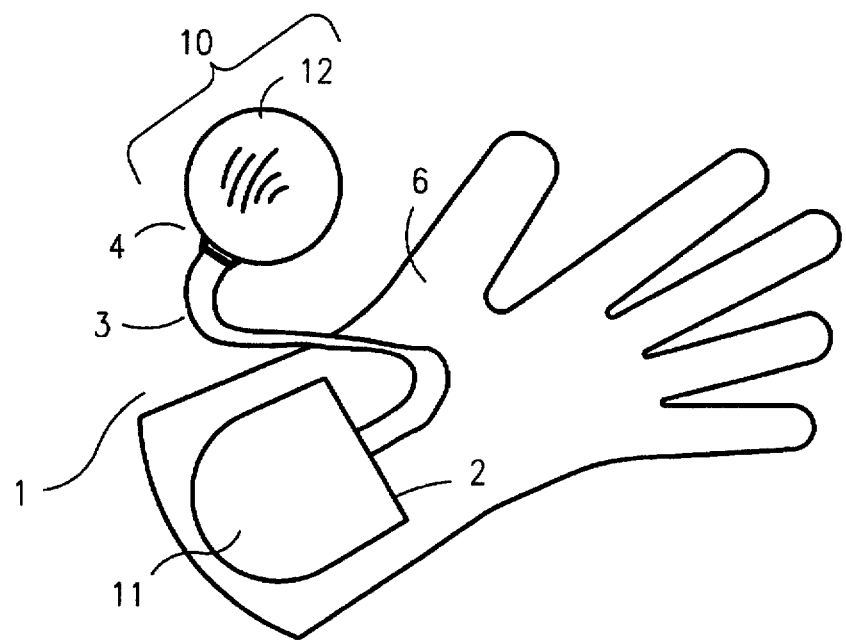
FIG. 1 is a plan view of the diver's mirror implemented on a pouch attached to a glove.

Reference numbers refer to the same or equivalent parts of the invention throughout the several figures of the drawing.

DETAILED DESCRIPTION OF THE PREFERRED EMBODIMENT

Referring now to FIG. 1, a plan view of the diver's mirror assembly 1 is depicted. The diver's mirror assembly 1 consists of a mirror 10 attached to a pouch 11. Pouch 11 in this embodiment is shaped in the form of flat, hollow sleeve closed at one end. The interior dimensions of pouch 11 are slightly smaller than the exterior dimensions of mirror 10. The end of pouch 11 opposite the closed end thereof defines opening 2 which allows the insertion and removal of mirror 10. Because the interior dimensions of pouch 11 are slightly smaller than the exterior dimensions of mirror 10, mirror 10 is retained in pouch 11 by means of elastic friction. Alternatively, the pouch could be made somewhat larger than the mirror to provide a loose-fitting pouch.

Mirror 10 can be constructed similar to mirrors well known in the art. Glass with reflective backing material, as is used in commercial grade mirrors, provides a clear and easily viewed image as does plastic, similarly coated. Mirror 10 can also be made from any corrosion resistant metal such as stainless steel, chrome or bronze. In the case of metals, the reflective surface 12 must be highly polished in order to attain an accurate reflection. Although mirror 10 is depicted as circular in planar view, it is readily understood that it may be any shape including rectangular or hexagonal.

FIG. 1 depicts mirror 10 as a flat surface. In this embodiment, the image reflected to the diver is true and undistorted. However, certain advantages can be attained by using other than a flat surface. For instance, reflective surface 12 can be formed as a convex or concave surface as is well known in the art of optics. A convex surface will have the effect of increasing the user's field of vision. Although the image appears smaller to the diver, a wider angle can be seen. This embodiment is especially useful for the diver to see his entire upper torso, head or surroundings behind him at one glance without having to pan the image to various locations of interest. A concave surface narrows the diver's field of vision but provides magnification for detailed work. According to the principle of the present invention, reflective surface 12 may have any combination of flat, concave or convex surfaces implemented on one or both sides of reflective surface 12.

In order to definitely preclude the loss of mirror 10, it is attached to tether 3. Tether 3 may formed of any corrosion resistant materials such as fabrics, plastics, any of several synthetic materials including NYLON®, rubbers or leathers. Tether 3 is further attached to pouch 11 by any of several methods including sewing, heat sealing, riveting, the application of hook-and-loop tape, adhesives, mechanical fasteners, or other attachment means well known to those of ordinary skill in the art. Tether 3 may be of any length according to the diver's preference.

Tether 3 may be attached directly to mirror 10, again by sewing, gluing, heat sealing, riveting, the application of hook-and-loop tape, thermal melting or welding, ultrasonic welding, or any other attachment means well known to those of ordinary skill in the art. In the preferred embodiment shown in FIG. 1, loop 4 is formed integrally with mirror 10, and tether 3 is attached to loop 4 by means of stitching. Alternatively, loop 4 may be formed of any corrosion resistant material such as plastic, bronze or stainless steel. Loop 4 may be formed integrally with reflective surface as discussed, or may be formed integrally with a backing plate (not shown) to which mirror 10 is attached.

In the embodiment of the present invention shown in FIG. 1, wherein the diver's mirror is attached to a glove 6, pouch 11 is attached to glove 6 by sewing and gluing a portion of its periphery to glove 6. Alternatively, pouch 11 may be attached to glove 6 by any of several methods including sewing, gluing, heat sealing, riveting, the application of hook-and-loop tape, by other attachment means well known to those of ordinary skill in the art, or by combinations thereof. Further, while the diver's mirror in FIGS. 1-7 is shown as being attached to a glove, it will be obvious to one of ordinary skill in the art that the principles of the present invention are equally applicable to attaching the mirror to any item of diver's equipment. Such embodiments are specifically contemplated by the present invention.

It will be immediately apparent that pouch 11 may be attached to a glove in any of several locations including, but not limited to, the palm, back or sides. The pouch opening may further be open on any of its several sides, and the pocked geometry may be of any shape conformable to the shape of mirror 10.

Another optional feature is a rubber or neoprene protective gasket which surrounds the edges of mirror 10 and the edge of a backing plate where implemented. In this manner, mirror 10 is protected from scrapes or edgewise blows which could serve to damage it, or to dislodge it from the backing plate.

Figure 2:
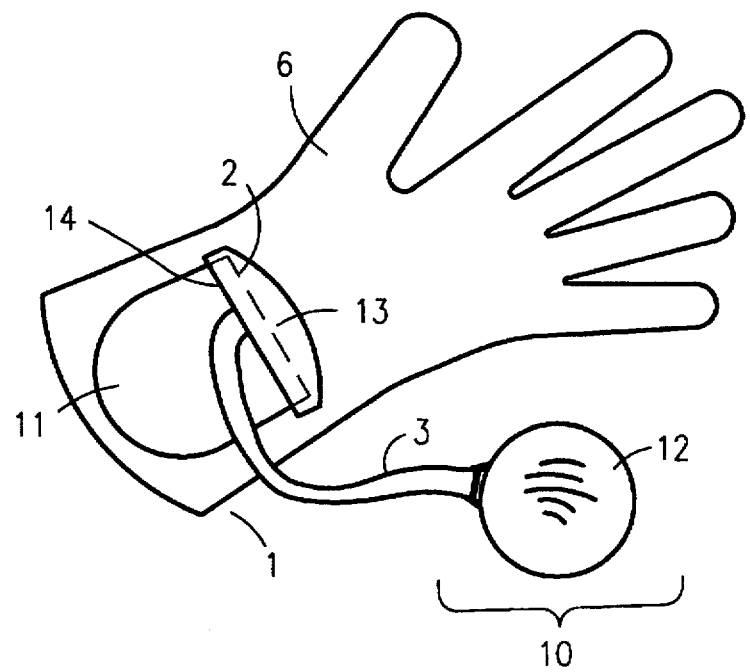
FIG. 2 is an plan view of an alternative embodiment of the diver's mirror implemented on a pouch attached to a glove, wherein the pouch has a covering flap to preclude the unwanted egress of the mirror therefrom and of forced water and debris therein.

Turning now to FIG. 2, an alternate embodiment of the invention is depicted, shown in this example as being implemented on a glove. In this embodiment, pouch 11 is attached in the normal manner, but is augmented with a cover flap 13. Cover flap 13 comprises a second pouch, again secured about a portion of its periphery to the glove, and thereby defining an opening 14. Cover flap 13 is applied to glove 6 in such manner as to substantially overlie pouch 1 and opening 2 in pouch 1 through which the user removes mirror 10. This embodiment has the advantage of precluding the unwanted egress of the mirror from pouch 1, a particularly desirable feature, especially when diving in rough water such as through the surf zone.

Figure 3:
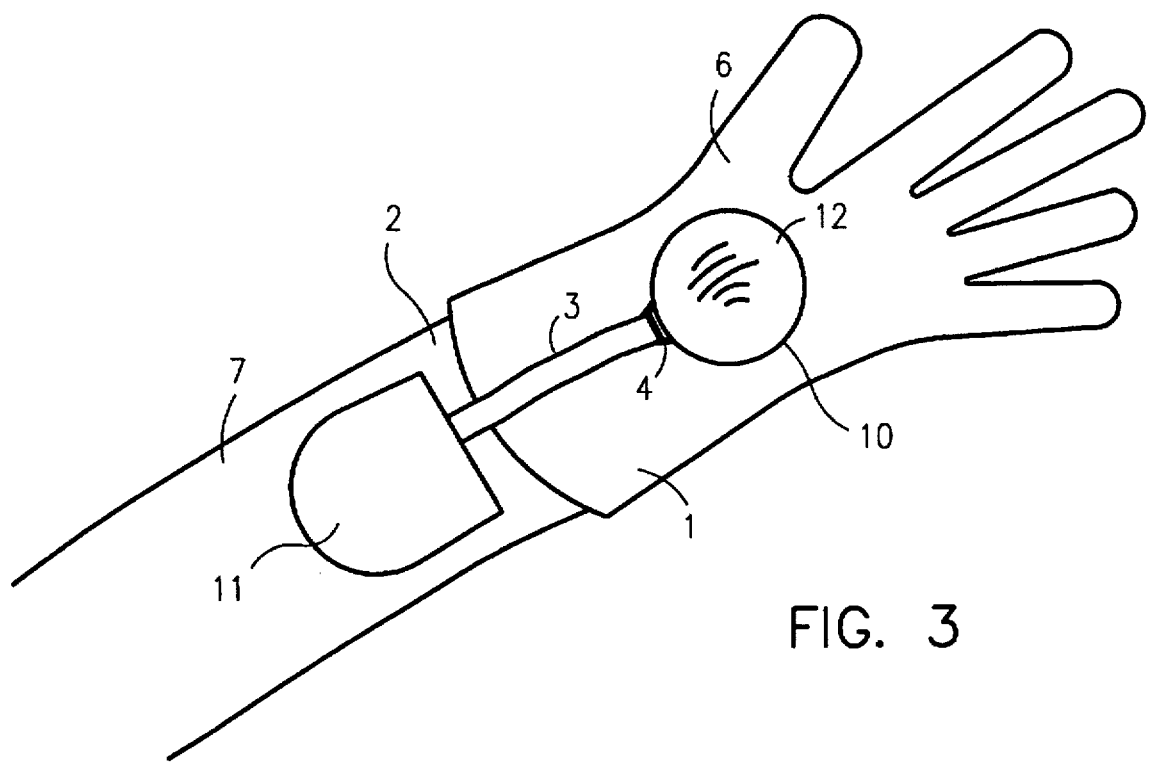
FIG. 3 is plan view of the diver's mirror implemented on a pouch attached to the wrist of a diver's wet suit.

Referring now to FIG. 3, the present invention is shown embodied on the wrist of a diver's wet suit. Again, the pouch may be attached thereto by sewing, gluing, heat sealing, riveting, the application of hook-and-loop tape, or other attachment means well known to those of ordinary skill in the art. Reflective surface 12 can again be any combination of the flat, convex or concave styles previously described.

When the diver needs mirror 10 for viewing, the diver withdraws mirror 10 from pouch 11 and holds it in his or her palm. Mirror 10 is prevented from falling or being lost by tether 3. Tether 3 is, by way of example, a flat neoprene strap which can be easily flexed. Although tether 3 is depicted as a flat, neoprene strap, it is readily understood that it could be a cord or any corrosion resistant, flexible material or a stainless steel cable. This embodiment of the invention offers the advantage that the diver can easily position the mirror for a clear view by holding it in his or her palm. Thus, the diver can position the mirror using the full flexibility of the wrist.

Figures 4, 5:
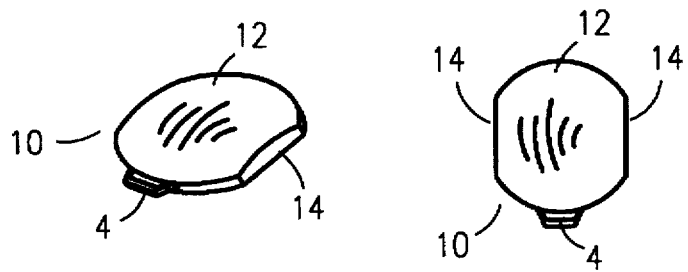
FIG. 4 is perspective view of the diver's mirror implemented as a convex mirror with clipped sides.
FIG. 5 is a plan view of the diver's mirror implemented as a convex mirror with clipped sides.

Having reference now to FIG. 4, a perspective view of one embodiment of mirror 10 is shown. In this embodiment mirror 10 presents a convex surface having at least one clipped edge 14 and having attached thereto loop 4. Loop 4 may be formed integrally with mirror 10 or may be formed separately and subsequently attached thereto. Alternatively, loop 4 may be attached to a backing plate (not shown) either integrally or formed separately and subsequently attached. FIG. 5 is a plan view of the mirror 10 of FIG. 4.

Figure 6:
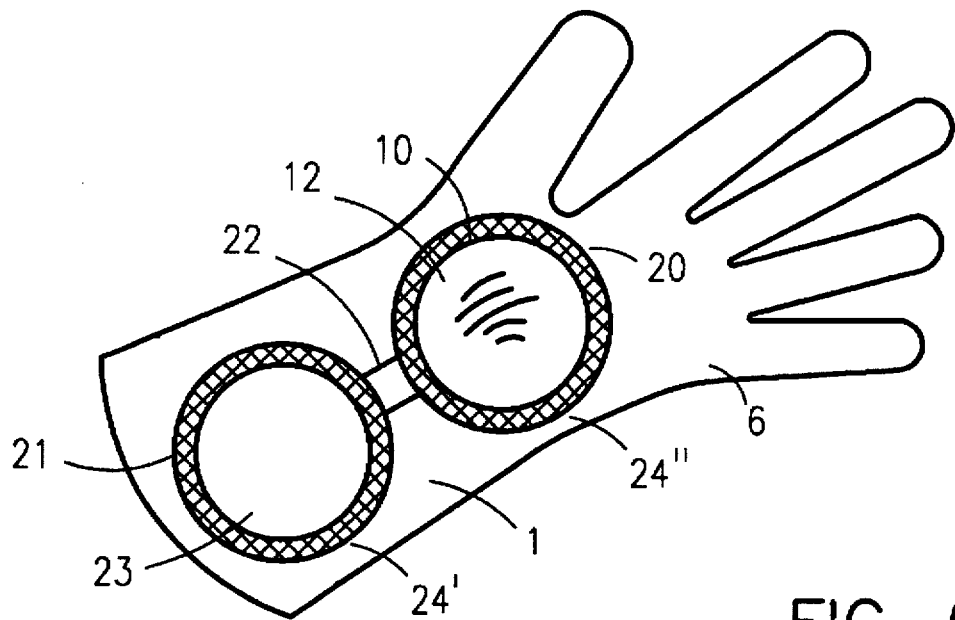
FIG. 6 is a plan view of an alternative pouch design for the diver's mirror utilizing hook-and-loop tape for securing the mirror within the pouch, and the tether as a hinge.

Referring now to FIG. 6, another embodiment of the present invention is shown. According to this embodiment, mirror 10 is attached to and protected by protective cover 20. Protective cover 20 is shaped to substantially conform to the outline of mirror 10 and is broader in extent than mirror 10. Protective cover 20 is substantially flat and planar. Protective cover 20 may be made from any soft, water resistant material such as plastic, rubber neoprene, or foams thereof. Cover 20 is connected to receptacle 21 by means of hinge 22. Hinge 22 may be formed of any flexible, water-resistant material, including but not limited to plastics, rubbers, neoprene, Nylon® and the like. Receptacle 21 defines therein a depression 23 into which is received mirror 10 when this embodiment of the present invention is closed.

When closed, mirror 10 is retained in place in depression 23 of receptacle 21 by means of a mechanical fastener 24. In this example of the present invention, fastener 24 takes the form of hook and loop tape of the type sold by the Velcro® Corporation. Alternative mechanical fasteners may, with equal facility be implemented. By folding cover 20 including mirror 10 over receptacle 21 and securing hook tape 24" to loop tape 24', mirror 10 is protected from damage. When the diver needs to view mirror 10 he or she can easily detach hook tape 24" from loop tape 24' and open cover 20 to reveal the surface of mirror 10.

Figure 7:
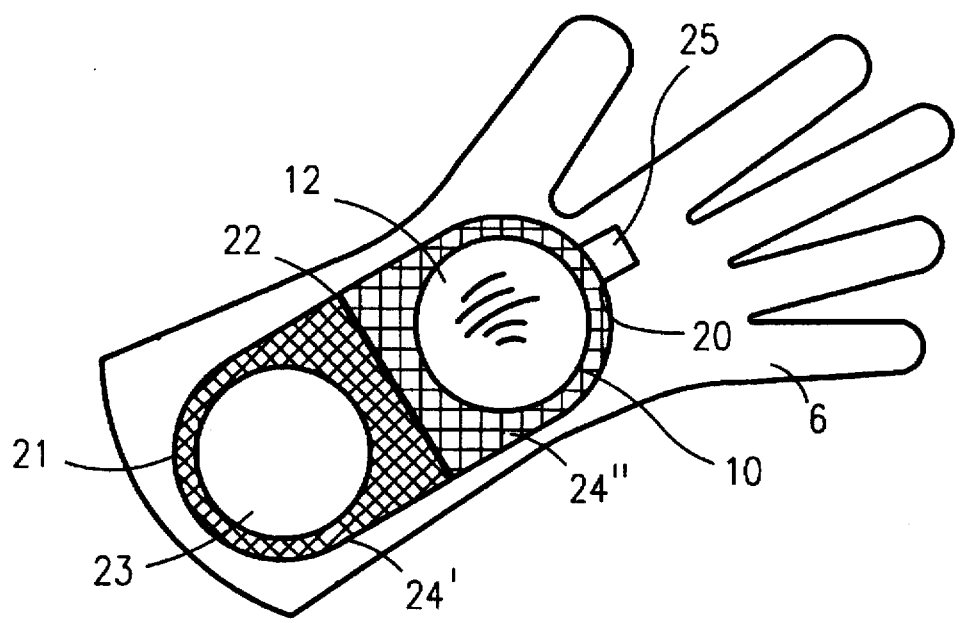
FIG. 7 is a plan view of a further alternative pouch design for the diver's mirror utilizing hook-and-loop tape for securing the mirror within the pouch.

A further refinement of this embodiment is shown in FIG. 7. According to this embodiment, cover 20, receptacle 21, and hinge 22 are integrally formed as a flexible, hinged plate of foam rubber. One example of this type of material is marketed by the Rubatex® Corporation as G-231-N2S. The function and operation of this embodiment are substantially similar to the embodiment shown in FIG. 6 with two exceptions. First, the hinged pouch 26 includes hinge 22 which has the twin functions of enabling access to mirror 10 and of acting as the previously described tether. Second, in order to make the opening of the device more facile, by means of example but not limitation for diver's working in cold water, a tab, 25 has been added to cover 20 substantially opposite from hinge 22. Tab 25 may be formed integrally with cover 20 or may be attached thereto. Tab 25 is not provided with hook-and-loop tape 24, and hence remains easily accessible to the diver. Tab 25 may be rectangular or any other shape easily grasped by the diver.

In use, mirror 10 greatly extends the diver's peripheral vision. Mirror 10 allows the diver to see behind him or her without turning the body. Mirror 10 also allows the diver to view and access equipment mounted on his upper torso or head, or held in pockets of a buoyancy compensation vest worn around the upper body. The normal restriction of movement and vision caused by the diver's face mask, wet suit and breathing regulator is thus alleviated. In this manner, the diver can easily check his own gear:and grasp accessory equipment. Thus, whether the diver is performing work underwater or just enjoying the surroundings, his actions become more efficient and his safety is significantly improved. In addition, because the diver can easily view and check his own equipment, the diver's safety is further improved. By eliminating the need to have a diving partner inspect equipment or assist in accessing equipment, the diving partner's efficiency and safety are also improved. Yet another benefit to the mirror 10 is that the diver can use it as an inspection mirror to view into small or fight places. This inspection capability is very useful when the diver is performing work underwater or when he is viewing marine life forms which typically inhabit crevices under or within rocks and coral. Another safety benefit of the invention is that it allows a diver to check on the location of a diving buddy, other divers, or other objects of interest without turning the body. Although only one mirror 10 is depicted in each of the preceding exemplar embodiments, it is readily understood that a diver may use a plurality or mirrors attached to such locations or items of equipment as required to improve peripheral vision.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, variations in materials, attachment methodologies, mirror configurations and geometries and tether designs are all specifically contemplated by the principles of the present invention. Most particularly, while several exemplary embodiments depicted in the drawing herein are generally drawn to the present invention being implemented on a glove, it should be particularly noted that the principles of the present invention are specifically contemplated as being applicable to implementation on any article of a diver's dress, equipment or equipage. The invention disclosed herein may be practiced without any element which is not specifically disclosed herein.

I claim:

1. A diver's mirror assembly comprising:
 a mirror having a reflective surface;
 a pouch for housing said mirror when not in use;
 a cover flap overlying at least a portion of said pouch;

a flexible tether having first and second ends, said first end being connected to said mirror and said second end being attached to said pouch;

first attachment means for attaching said pouch to an item of diver's equipment; and second attachment means for attaching said cover flap to said item of diver's equipment.

2. The diver's mirror assembly of claim 1 wherein said reflective surface is selected from the group consisting of: flat, convex, and concave.

3. A diver's mirror assembly comprising:

a mirror having at least one reflective surface;

a flexible pouch for housing said mirror;

a cover flap overlying at least a portion of said pouch;

a flexible tether having first and second ends;

first tether attachment means for attaching said mirror to said first end of said tether;

second tether attachment means for attaching said second end of said tether to said pouch;

pouch attachment means for attaching at least a portion of the periphery of said pouch to an item of diver's equipment; and cover flap attachment means for attaching a portion of said cover flap to said item of diver's equipment.

4. The diver's assembly mirror of claim 3 wherein said reflective surface is selected from the group consisting of: flat, convex, and concave.

5. The diver's assembly mirror of claim 3 wherein said mirror is formed of a material selected from the group consisting of: glass, plastic, and corrosion-resistant metal.

6. The diver's assembly mirror of claim 3 wherein said tether is formed of a material selected from the group consisting of: fabric, plastic, neoprene, rubber and leather.

7. The diver's assembly mirror of claim 5 wherein said first tether attachment means further comprises a loop in operative combination with said mirror for attachment to said tether.

8. The diver's assembly mirror of claim 7 wherein said loop is formed integrally with said mirror.

9. The diver's assembly mirror of claim 7 wherein said loop is formed separate from said mirror and subsequently attached thereto.

10. The diver's assembly mirror of claim 3 wherein said first tether attachment means further comprises a backing plate for attachment to said mirror, said backing plate including a loop for attachment to said tether.

11. The diver's assembly mirror of claim 3 wherein said pouch is formed of material selected from the group consisting of: fabric, plastic, neoprene, rubber, foam rubber, and leather.

12. The diver's assembly mirror of claim 3 wherein said pouch attachment means is selected from the group consisting of: adhesive, stitching, hook-and-loop tape; and mechanical fastener.

13. A diver's mirror assembly comprising:

a mirror having a reflective surface;

a tether having first and second ends;

a backing plate in operative combination with said mirror, said backing plate including a loop for attachment to said tether;

a pouch attachable by a portion of its periphery to an item of diver's equipment, thereby forming a first flat, hollow sleeve having an first opening for inserting and removing said backing plate in operative combination with said mirror into said pouch, said pouch being of smaller extent than said backing plate in operative combination with said mirror, said pouch for housing therein said backing plate in operative combination with said mirror when not in use, and for retaining therein by means of elastic friction said backing plate in operative combination with said mirror;

a cover flap comprising a second flat, hollow sleeve attachable by a portion of its periphery to said item of diver's equipment and defining a second opening, said cover flap overlying a portion of said pouch and at least a portion of said first opening for preventing the unwanted egress of said backing plate in operative combination with said mirror;

tether attachment means for attaching said second end of said tether to said pouch; and said mirror assembly providing a method whereby a diver can easily remove said mirror from said pouch and hold said mirror in the palm of a hand and view his upper torso, head, or surroundings by adjusting the inclination of said mirror and viewing a reflected image on said mirror.

* * * * *